United States Patent
Feng et al.

(10) Patent No.: US 9,494,729 B2
(45) Date of Patent: Nov. 15, 2016

(54) BACKLIGHT SOURCE AND DISPLAY DEVICE

(71) Applicants: BOE TECHNOLOGY GROUP CO., LTD., Beijing (CN);
(Continued)

(72) Inventors: Bin Feng, Beijing (CN); Yingqiang Gao, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 100 days.

(21) Appl. No.: 14/494,652

(22) Filed: Sep. 24, 2014

(65) Prior Publication Data
US 2015/0362662 A1 Dec. 17, 2015

(30) Foreign Application Priority Data
Jun. 16, 2014 (CN) .......................... 2014 1 0268581

(51) Int. Cl.
*F21V 8/00* (2006.01)

(52) U.S. Cl.
CPC ........... *G02B 6/0068* (2013.01); *G02B 6/0006* (2013.01); *G02B 6/0026* (2013.01); *G02B 6/0031* (2013.01); *G02B 6/0051* (2013.01); *G02B 6/0078* (2013.01)

(58) Field of Classification Search
CPC ................ G02B 6/0068; G02B 6/0078; G02B 6/0006; G02B 6/0051; G02B 6/0031
(Continued)

(56) References Cited

U.S. PATENT DOCUMENTS

| 2005/0140848 | A1* | 6/2005 | Yoo | G02B 6/0043 349/64 |
| 2007/0188677 | A1* | 8/2007 | Souk | G02B 6/0078 349/65 |

(Continued)

FOREIGN PATENT DOCUMENTS

| CN | 1162758 A | 10/1997 |
| CN | 201909229 U | 7/2011 |

(Continued)

OTHER PUBLICATIONS

Office Action in Chinese Patent Application No. 201410268581.7, dated Nov. 20, 2015.
(Continued)

*Primary Examiner* — Laura Tso
(74) *Attorney, Agent, or Firm* — Bakerhostetler LLP

(57) ABSTRACT

The present disclosure provides a backlight source and a display device. The backlight source is adapted to provide backlight to a display panel. The display panel includes a plurality of pixel units each of which includes a plurality of sub-psub-pixels. The backlight may provide different colors of backlight respectively to different sub-psub-pixels of the pixel unit. Since the backlight source may provide different colors of backlight respectively to the different sub-psub-pixels of the pixel unit, a colorful displaying may be achieved through the backlight provided by the backlight source. Therefore, there is no needs to provide color resists in opening areas between black matrixes of an upper substrate of the display panel, and thus the usage of the backlight source may improved. Furthermore, the manufacturing cost of the display panel may reduced due to the color resist needs not to be manufactured.

8 Claims, 4 Drawing Sheets

(71) Applicants: BEIJING BOE DISPLAY TECHNOLOGY CO., LTD., Beijing (CN)

(58) Field of Classification Search
USPC .................................................. 362/555, 616
See application file for complete search history.

(56) References Cited

U.S. PATENT DOCUMENTS

| | | | |
|---|---|---|---|
| 2008/0030650 A1* | 2/2008 | Kitagawa | G02B 6/0068 349/65 |
| 2008/0252818 A1* | 10/2008 | Wu | G02B 6/0078 349/65 |
| 2009/0052204 A1* | 2/2009 | Kawashima | G02B 6/0078 362/555 |
| 2010/0253881 A1* | 10/2010 | Han | G02F 1/133615 349/65 |
| 2011/0141401 A1* | 6/2011 | Lee | G02B 6/0011 349/65 |
| 2012/0120677 A1* | 5/2012 | Miyairi | G02B 6/0035 362/602 |
| 2012/0243086 A1* | 9/2012 | Kim | G02B 6/0076 359/466 |
| 2013/0155503 A1 | 6/2013 | Yen et al. | |
| 2014/0126242 A1* | 5/2014 | Chen | F21S 11/002 362/610 |
| 2014/0146251 A1 | 5/2014 | Lee et al. | |

FOREIGN PATENT DOCUMENTS

| | | |
|---|---|---|
| CN | 103123076 A | 5/2013 |
| CN | 203453947 U | 2/2014 |

OTHER PUBLICATIONS

Office Action in Chinese Patent Application No. 201410268581.7, dated Jun. 28, 2016.

\* cited by examiner

-PRIOR ART-

BACKLIGHT SOURCE AND DISPLAY DEVICE

CROSS-REFERENCE OF RELATED APPLICATIONS

The present disclosure claims priority to and incorporates by reference the entire contents of Chinese patent application No. 201410268581.7, filed on Jun. 16, 2014.

TECHNICAL FIELD

The present disclosure relates to the field of the display technology, and in particular to a backlight source and a display device.

BACKGROUND

In the structure of a traditional TFT-LCD (Thin Film Transistor-Liquid crystal display), since a backlight source may only provide the white light of full-wave band, colorful display will be not achieved unless that a RGB color resist is manufactured on an upper substrate of the display panel. The white light may include colors of red, green and blue. When the white light transmits the color resist on the panel, only one color of light transmits the color resist with a larger transmissivity, but the two other colors of light are absorbed by the material of the color resist. Therefore, a significant part of the energy is lost during the process in which the backlight transmits the color resist of the panel, and thus the usage of the light source is low. Furthermore, the process in which a color resist is manufactured on the panel is relatively complicated and it is difficult to reduce the cost thereof.

SUMMARY

In view of the above-mentioned, the present disclosure provides a backlight source and a display device in order to solve the issues of the usage of the backlight being low and the manufacturing cost of the display panel being high.

In order to solve the above issues, the disclosure provides a backlight source adapted to provide backlight to a display panel, the display panel including a plurality of pixel units each of which including a plurality of sub-pixels, wherein the backlight source is capable of providing different colors of backlight respectively to different sub-pixels of the pixel unit.

Alternatively, the back light may include:

a light guide plate, including a plurality of light guide bars and a plurality of isolation bars, wherein the light guide bars and the isolation bars are arranged alternately, and each of the light guide bars corresponds to a column of sub-pixels;

a plurality of colors of monochromatic light sources, each of the light guide bars corresponding to one color of monochromatic light sources.

Alternatively, each of the monochromatic light sources may correspond to one of the light guide bars.

Alternatively, each of the monochromatic light sources may correspond to at least two of the light guide bars through an optical fiber.

Alternatively, the plurality of colors of monochromatic light sources comprises a red light source, a green light source and a blue light source.

Alternatively, the backlight source may include:

a light guide plate, including a plurality of light guide bars and a plurality of isolation bars, wherein the light guide bars and the isolation bars are alternately arranged, and each of the light guide bars corresponds to a column of sub-pixels;

a plurality of colors of light filters arranged at light incident ports or light exiting surfaces of the light guide bars, wherein one of the light filters is arranged at the light incident port or the light exiting surface of each of the light guide bars; and one or more white light sources corresponding to each of the light guide bars.

In a case where there exists only one white light source, the white light source corresponds to each of the light guide bars through an optical fiber.

In a case where there exist more than one white light sources, and the number of the white light sources is less than the number of the light guide bars, one of the white light sources corresponds to at least two of the light guide bars through an optical fiber.

In a case where the number of the white light sources is equal to the number of the light guide bars, each of the white light sources corresponds to one of the light guide bars.

Alternatively, the plurality colors of light filters may include a red light filter, a green light filter and a blue light filter.

Alternatively, each of the isolation bars may be a total reflection isolation bar.

Alternatively, the backlight may further include:

a diffusion film arranged above the light guide plate;

a reflection sheet, arranged below the light guide plate; and a bottom plate, arranged below the reflection sheet.

The disclosure further provides a display device including a display panel and the backlight source, wherein the display panel includes an upper substrate and a lower substrate, and open areas between black matrixes on the upper substrate are not provided with color resists.

The above solutions of the disclosure have the following technical advantages.

Since the backlight source may provide different colors of backlight respectively to different sub-pixels of the pixel unit, a colorful displaying may be achieved through the backlight provided by the backlight source. Therefore, there is no need to provide color resists in opening areas between black matrixes of an upper substrate of the display panel, and thus the usage of the backlight may improved. Furthermore, the manufacturing cost of the display panel may be reduced due to the color resist needs not to be manufactured.

DETAILED DESCRIPTION

Figure 1:
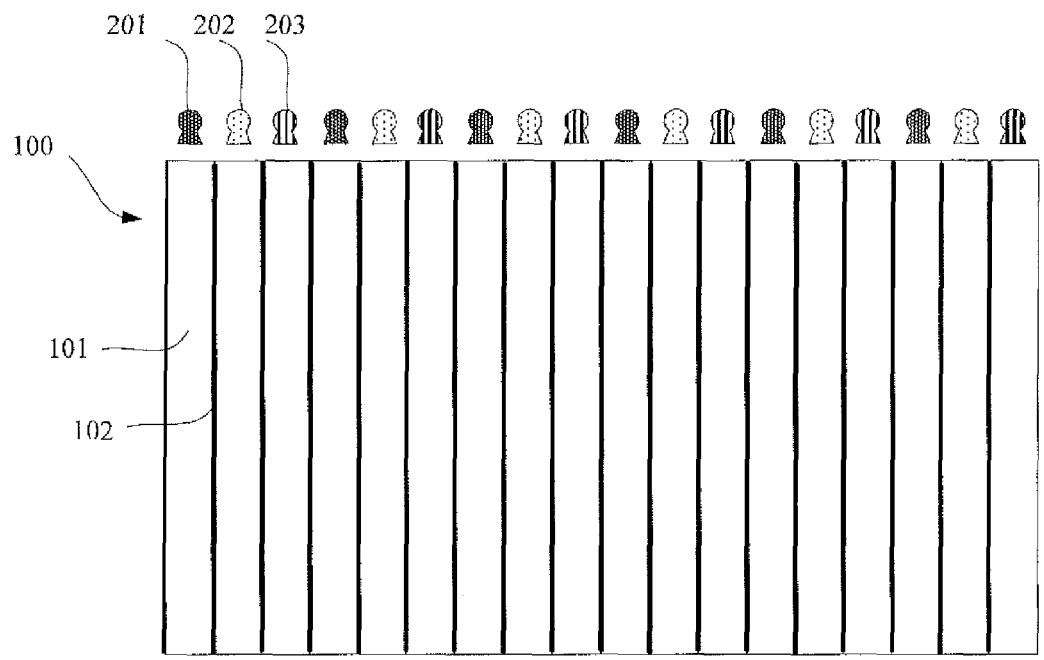
FIG. 1 is a structural schematic diagram of a backlight source according to a first embodiment of the disclosure.

In order to solve the issue of the usage of a backlight source being low and the manufacturing cost of a display panel being high in the existing technology, an embodiment of the disclosure provides a backlight source. The backlight source is adapted to provide backlight to a display panel. The display panel includes a plurality of pixel units each of which includes a plurality of sub-pixels. The backlight source is capable of providing different colors of light to different sub-pixels of the pixel unit.

The pixel unit is located on a lower substrate of the display panel and typically includes a TFT (thin film transistor) and a pixel electrode.

For example, the backlight source according to the embodiment of the disclosure may provide backlight of three colors of red, green and blue, allowing the sub-pixels of each pixel unit to respectively correspond to red, green and blue.

Apparently, according to some embodiments of disclosure, the backlight source is capable of providing colors other than red, green and blue, as required by the displaying of the display panel.

Since the backlight source is capable of providing different colors of light respectively to the different sub-pixels of the pixel unit, colorful displaying may be achieved through the backlight provided by the backlight source. Therefore, it is not necessary to provide color resists on opening areas between black matrixes of an upper substrate of the display panel, and thus the usage of the backlight source may be improved. Furthermore, the manufacturing cost of the display panel may be reduced due to that the color resists need not to be manufactured.

The backlight source typically includes a diffusion film, a light guide plate, a light source, a reflection sheet, a bottom plate etc. The light source is adapted to emit light to a light incident port of the light guide plate. The light guide plate is adapted to uniformly direct the light entered from the light incident port out of a light exiting surface. The diffusion film is provided above the light guide plate, and adapted to diffuse the exiting light from the light guide plate in order to make the light to be provided to the display panel more uniform. The reflection sheet is provided below the light guide plate, and adapted to achieve a single-side light exiting from the light guide plate in order to improve the luminance of the light exiting from the light guide plate. The bottom plate is provided below the reflection sheet and adapted to support other components.

According to the embodiment of the disclosure, the light guide plate and the light source may be improved to provide different colors of backlight respectively to the different sub-pixels of the pixel unit.

Alternatively, the backlight source may include:

a light guide plate, including a plurality of light guide bars and a plurality of isolation bars, where the light guide bars and the isolation bars are arranged alternately, each of the light guide bars corresponds to a column of the sub-pixels; and a plurality of colors of monochromatic light sources, each of the light guide bars corresponding to one color of the monochromatic light sources.

Particularly, each of the monochromatic light sources may correspond to one of the light guide bars, or each of the monochromatic light sources may correspond to at least two of the light guide bars through an optical fiber.

The plurality of colors of monochromatic light sources may include a red light source, a green light source or a blue light source, or may include other colors of monochromatic light sources as required by the displaying of the display panel.

According to the embodiment, the backlight source may provide different colors of backlight through the plurality of colors of monochromatic light sources. Apparently, according to other embodiments of the disclosure, only white color of monochromatic light sources may be employed to provide the backlight. In this case, the backlight source may include:

a light guide plate, including a plurality of light guide bars and a plurality of isolation bars, where the light guide bars and the isolation bars are arranged alternately, and each of the light guide bars corresponds to a column of sub-pixels;

a plurality of colors of light filters, arranged at light incident ports or light exiting surfaces of the light guide bars, where one of the light filters is arranged at the light incident port or the light exiting surface of each of the light guide bars; and one or more white light sources corresponding to the light guide bars.

The plurality of colors of light filters may include a red light filter, a green light filter and a blue light filter. Alternatively, other colors of light filters may be required for the displaying of the display panel.

In a case where there exists only one white light source, the white light source may correspond to each of the light guide bars through an optical fiber. In a case where there exist more than one white light sources and the number of white light sources is less than the number of the light guide bars, one white light source may correspond to at least two of the light guide bars through the optical fiber. In a case where the number of the white light sources is equal to the number of light guide bars, each of the white light sources corresponds to one of the light guide bars.

In order to further improve the usage of the light, according to the embodiment of the disclosure, each of the isolation bars may be a total reflection isolation bar. Particularly, the isolation bar may be made of a total reflection material, or a surface of the isolation bar made of a non-transparent material may be coated with a total reflection layer.

According to the above embodiments, the light guide plate and light source of the backlight source are improved to provide different colors of light respectively to the different sub-pixels of the pixel unit. Of course, according to other embodiments of the disclosure, the backlight source may employ other structures to provide different colors of backlight respectively to the different sub-pixels of the pixel unit. For example, a light filter layer may be arranged on the light guide plate. The light filter layer may include a plurality of light filter areas and a plurality of isolation bars. The light filter areas and the isolation bars may be alternately arranged, and each of the light filter areas may correspond to a column of sub-pixels. The light filter areas may include a red light filter area, a green light filter area and a blue light filter area, or may further include other colors of light filter areas as required by the displaying of the display device.

In order to make the technical issues to be solved, technical solutions and advantages of disclosure to be clearer, detailed descriptions will be made in conjunction with the appended drawings and the embodiments.

Figure 2:
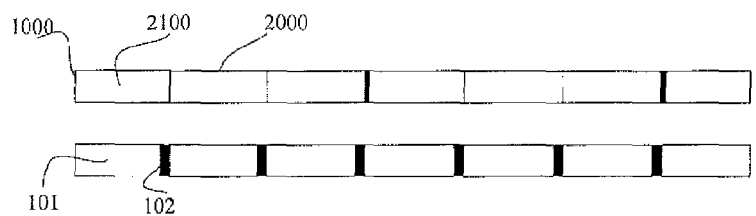
FIG. 2 is a sectional view of a light guide plate of FIG. 1.

FIG. 1 is a structural schematic diagram of a backlight source according to a first embodiment of the disclosure. FIG. 2 is a sectional view of a light guide plate of FIG. 1. The backlight source according to the embodiment of the disclosure is adapted to provide backlight to a display panel 1000. The display panel includes a plurality of pixel units 2000 each of which includes three sub-pixels 2100. The backlight source may provide different colors of backlight respectively to different sub-pixels of the pixel unit.

The backlight source may include:

a light guide plate 100, including a plurality of light guide bars 101 and a plurality of isolation bars 102, wherein the light guide bars 101 and the isolation bars are arranged alternately, and each of the light guide bars 101 corresponds to one column of the sub-pixels; and a plurality of light source sets, each of which includes a red light source 201, a green light source 202 and a blue light source 203, each of the monochromatic light sources corresponds to one of the light guide bars 101.

In order to further improve the usage of the light, each of the isolation bars 102 may be a total reflection isolation bar according to the embodiment of the disclosure.

Figure 3:
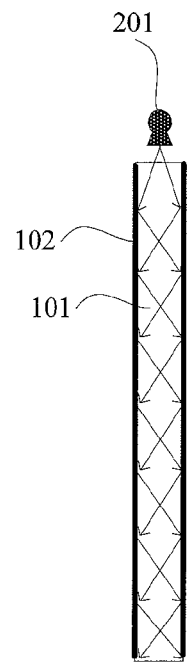
FIG. 3 is a schematic diagram of a light path in a light guide bar according to an embodiment of the disclosure.

FIG. 3 is a schematic diagram of a light path in the light guide bars according to the embodiment of the disclosure. As shown in this figure, since the light entering into the light guide bar 101 from a light incident port of the light guide bar 101 is blocked by the isolation bar 102, the light may be only diffused within that light guide bar and may not enter into another light guide bar.

Figure 4:
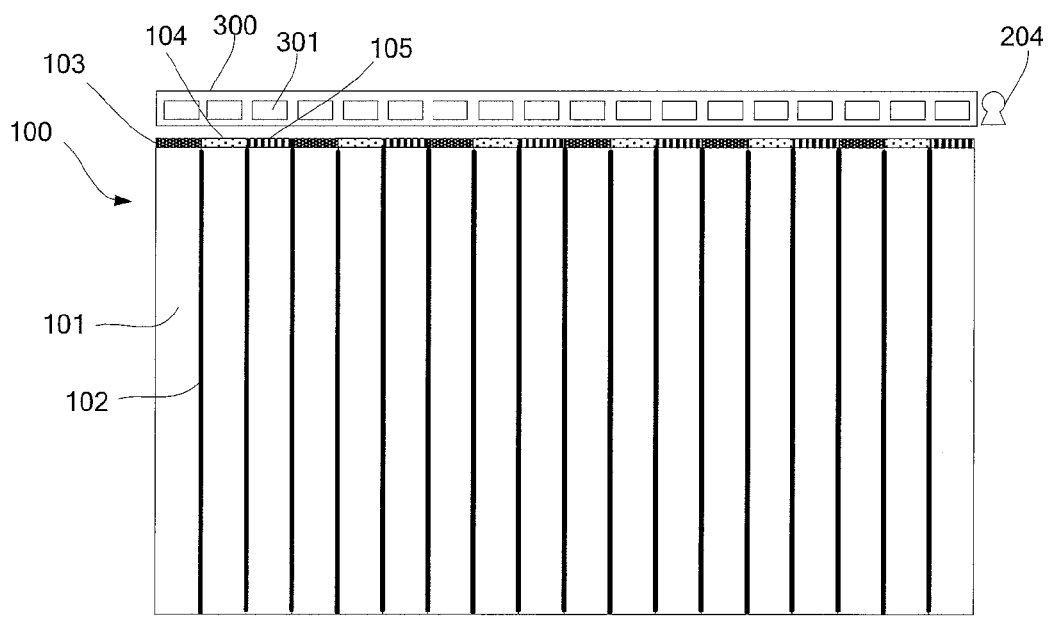
FIG. 4 is a structural schematic diagram of a backlight source according to a second embodiment of the disclosure.

FIG. 4 is a structural schematic diagram of a backlight source according to a second embodiment of the disclosure. The backlight source according to the embodiment of the disclosure is adapted to provide backlight to a display panel. The display panel includes a plurality of pixel units each of which includes three sub-pixels. The backlight source may provide different colors of backlight respectively to the different sub-pixels of the pixel unit.

The backlight source includes:

a light guide plate 100, including a plurality of light guide bars 101 and a plurality of isolation bars 102, wherein the light guide bars 101 and the isolation bars 102 are alternately arranged, and each of the light guide bars 101 corresponds to a column of sub-pixels;

a red light filter 103, a green light filter 104 and a blue light filter 105, which are arranged at light incident ports of the light guide bars 101, where one of the light filters is arranged at the light incident port of each of the light guide bars 101; and a white light source 204 corresponding to each of the light guide bars 101 through an optical fiber 300.

One end of the optical fiber 300 is connected to the white light source 204. The optical fiber 300 includes a plurality of light exiting surfaces 301 each of which corresponds to one of the light guide bars.

The monochromatic light source or white light source according to the above embodiments may be implemented with an LED light. One LED light source may correspond to at least two of the light guide bars through the optical fiber. The existing LED light source may be manufactured to have a size about 1 mm. The optical fiber may have a size of several micrometers and can certainly achieve the matching between the LED light source and the light guide bar.

Figure 5:
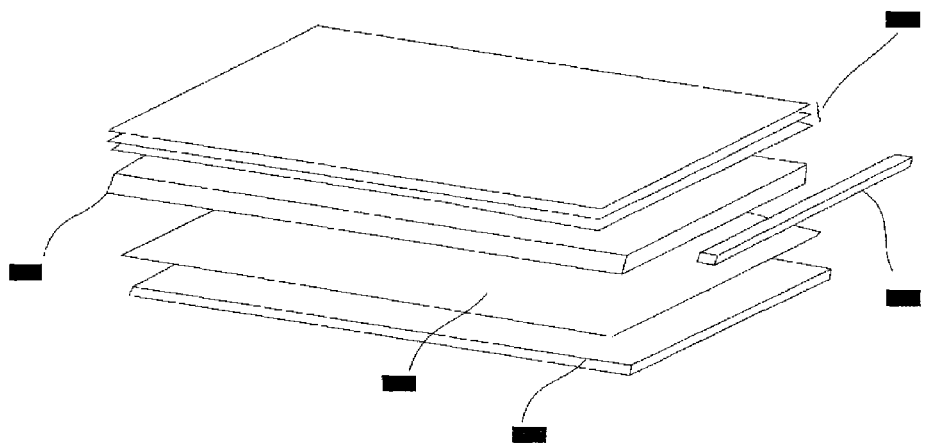
FIG. 5 is a structural schematic diagram of a backlight source according to a third embodiment of the disclosure.

FIG. 5 is schematical diagram of a backlight source according to a third embodiment. The backlight source according to the embodiment includes: a diffusion film 400, a light guide plate 100, a light source 200, a reflection sheet 500 and a bottom plate 600.

The light source 200 (including a plurality of monochromatic light sources or white light sources) may be an LED light bar which is arranged on one side of the light guide plate 100 and adapted to emit light to a light incident port of the light guide plate 100.

The light guide plate 100 is adapted to uniformly direct the light entered from the light incident port out of a light exiting surface, and the structure of the light guide plate 100 has been described in the above embodiment and the details thereof will omitted here.

The diffusion film 400 is arranged above the light guide plate 100 and is adapted to diffuse the light exiting from the light guide bar 100 in order to make the light to be provided to the display panel more uniform.

The reflection sheet 500 is arranged below the light guide plate 100, and is adapted to achieve a single-side light emitting from the light guide plate 100 in order to improve the luminance of the light exiting from the light guide plate.

The bottom plate 600 is adapted to support other components.

According to the embodiments, the light guide bars and isolation bars may be pressed and fitted into the light guide plate, and the light guide plate may further be prepared through a casting and forming process (by mould manufacturing).

A display device is further provided according to an embodiment of the disclosure, which includes a display panel and the backlight source. The display panel includes an upper substrate and a lower substrate. The lower substrate includes a plurality of pixel units each of which includes a plurality of sub-pixels. Opening areas between black matrixes on the upper substrate are not provided with color resists, and the back matrixes are adapted to prevent the interference between different colors of the backlight.

Figure 6:
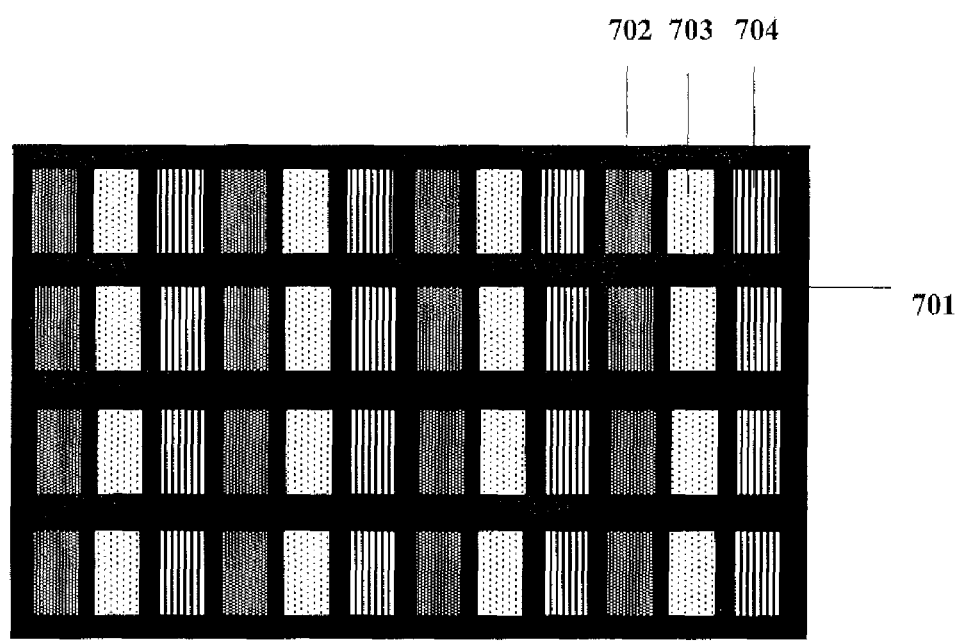
FIG. 6 is a structural schematic diagram of an upper substrate of a display panel of the existing technology.
Figure 7:
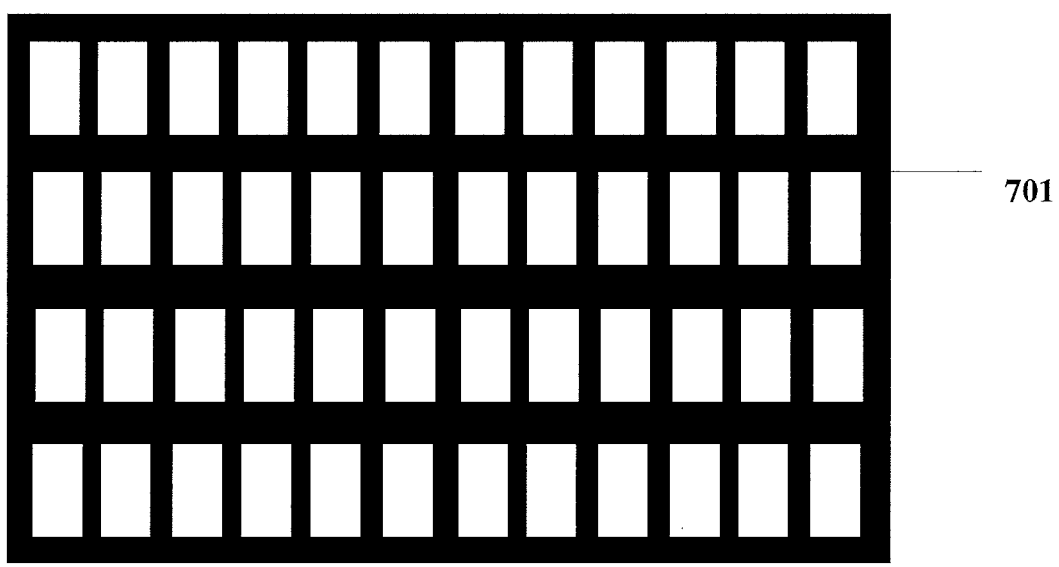
FIG. 7 is a structural schematic diagram of an upper substrate of a display panel according to an embodiment of the disclosure.

FIG. 6 is a structural schematic diagram of an upper substrate of a display panel of the existing technology. FIG. 7 is a structural schematic diagram of an upper substrate of a display panel according to the embodiment of the disclosure. As shown in FIG. 6 and FIG. 7, the upper substrate of the existing display panel includes black matrixes 701 and color resists (including a red resist 702, a green resist 703 and a blue resist 704 in this example) in opening areas between the black matrixes 701. However, in the upper substrate of the display panel according to the embodiment of the disclosure, the opening areas between the black matrixes 701 are not provided with color resists. Therefore, it may be prevented that the backlight from the backlight source is absorbed by the color resist and thus the usage of the backlight may be improved.

The above embodiments are merely preferable embodiments of the disclosure. It should be noted that several modifications and improvements may further be made by the skilled in the art without departing from the principles of the disclosure, and the modifications and improvements should fall within the protection scope of the disclosure.

What is claimed is:

1. A backlight source, adapted to provide backlight to a display panel, the display panel comprising a plurality of pixel units, each of the plurality of pixel units comprising a plurality of sub-pixels, wherein the backlight source is capable of providing different colors of backlight respectively to different sub-pixels of the pixel unit, wherein the backlight source further comprises:
a light guide plate, comprising a plurality of light guide bars and a plurality of isolation bars, wherein the light guide bars and the isolation bars are alternately arranged, and each of the light guide bars corresponds to a column of sub-pixels;
a plurality of colors of light filters arranged at light exiting surfaces of the light guide bars, wherein one of the light filters is arranged at the light exiting surface of each of the light guide bars; and
one or more white light sources corresponding to each of the light guide bars.

2. The backlight source according to claim 1, wherein in a case where there exists only one white light source, the white light source corresponds to each of the light guide bars through an optical fiber.

3. The backlight source according to claim 1, wherein in a case where there exist more than one white light sources, and the number of the white light sources is less than the number of the light guide bars, one of the white light sources corresponds to at least two of the light guide bars through an optical fiber.

4. The backlight source according to claim 1, wherein in a case where the number of the white light sources is equal to the number of the light guide bars, each of the white light sources corresponds to one of the light guide bars.

5. The backlight source according to claim 1, wherein the plurality colors of light filters comprises a red light filter, a green light filter and a blue light filter.

6. The backlight source according to claim 1, wherein each of the isolation bars is a total reflection isolation bar.

7. The backlight source according to claim 1, further comprising:
   a diffusion film arranged above the light guide plate;
   a reflection sheet, arranged below the light guide plate; and
   a bottom plate, arranged below the reflection sheet.

8. A display device comprising a display panel and the backlight source according to claim 1, wherein the display panel comprises an upper substrate and a lower substrate, and opening areas between black matrixes on the upper substrate are not provided with color resists.

* * * * *